UNITED STATES PATENT OFFICE.

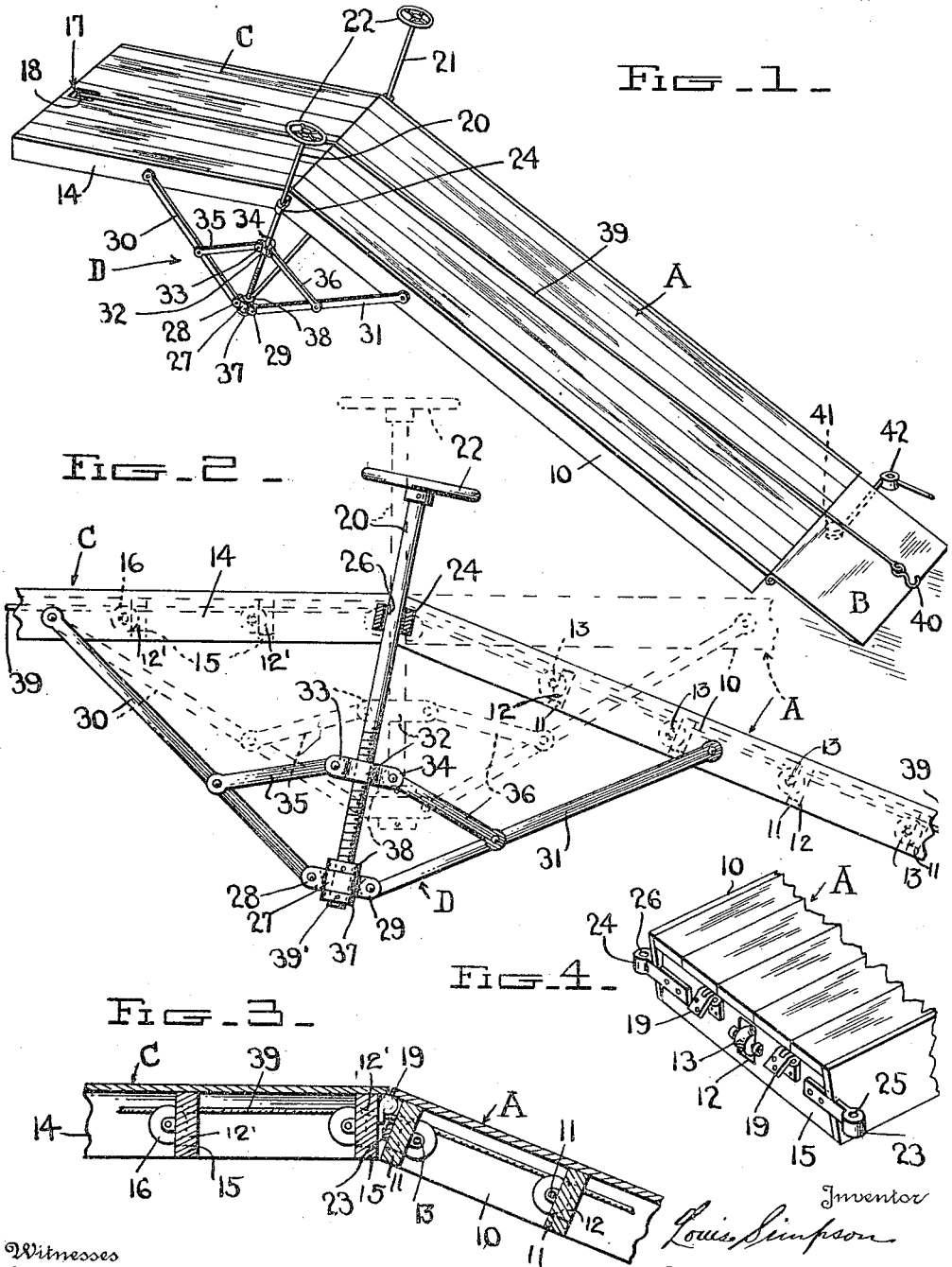
L. SIMPSON.
FREIGHT GANG PLANK.
APPLICATION FILED APR. 21, 1915.
1,232,437.
Patented July 3, 1917.
2 SHEETS—SHEET 1.

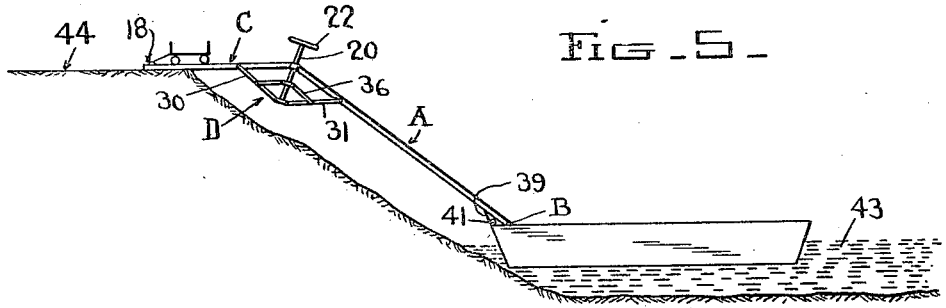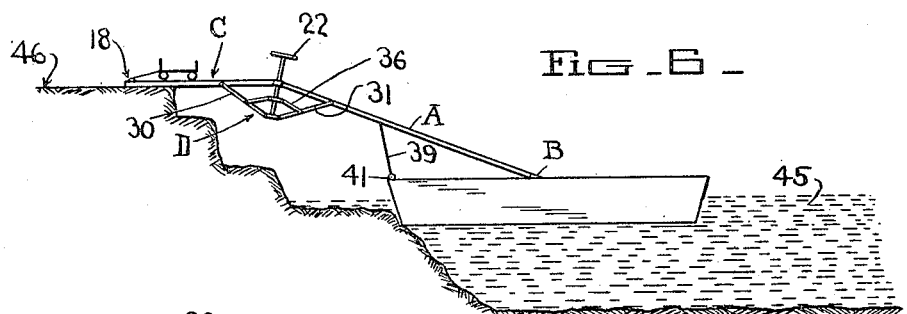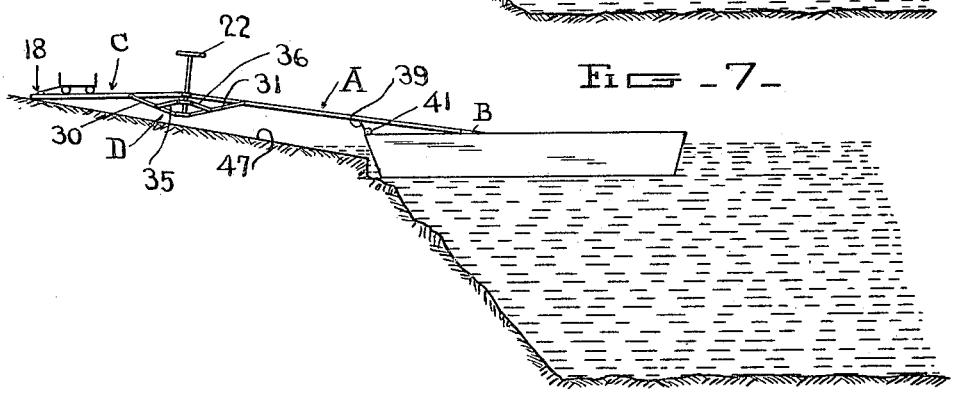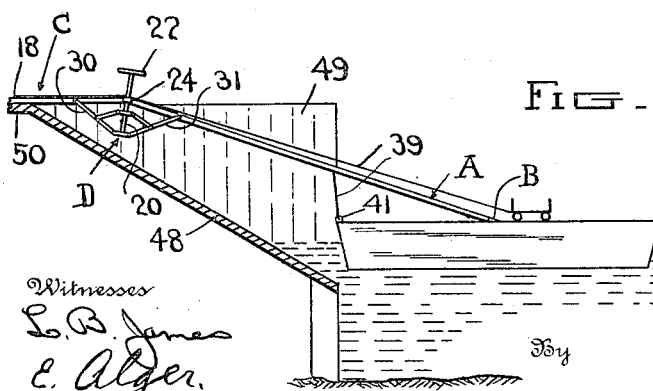

LOUIS SIMPSON, OF FORT WORTH, TEXAS.

FREIGHT GANG-PLANK.

1,232,437.  Specification of Letters Patent.  Patented July 3, 1917.

Application filed April 21, 1915. Serial No. 22,900.

*To all whom it may concern:*

Be it known that I, LOUIS SIMPSON, a citizen of the United States, residing at Fort Worth, in the county of Tarrant and State of Texas, have invented certain new and useful Improvements in Freight Gang-Planks, of which the following is a specification.

This invention relates to freight gang planks.

In the handling of freight on boats more or less difficulty is experienced because of peculiar landings, and much time and energy on the part of deck hands and others are wasted. Especially is this true in handling cargos on boats along the Mississippi, Ohio, Missouri, Arkansas, and other rivers for the rivers are not provided in most instances with docks, the landing places being composed generally of nothing more nor less than the natural banks of the river with irregularities so different that no two landings are alike. The irregularities in the natural or made banks along the rivers caused by constant use, climatic and other conditions, render it difficult to effect economical loading and unloading of freight. The irregularities in the banks and the rise and fall of the tide are also to be contended with.

Generally two gang planks in the form of straight structures of various lengths are employed, one adjacent each side of the boat at the front thereof. These common gang plank structures are raised and lowered and swung by derricks or other suitable means one at a time, depending upon which side of the boat lands next to the dock or bank. The result is that a large number of laborers have to be employed to load and unload the cargos and they generally accomplish this by carrying the freight on their shoulders or otherwise. Sometimes the freight is rolled by trucks over the common long straight gang planks and this is exceedingly laborious and at times quite impossible in the event of the deck being low with relation to the dock or top of the bank incident to low tide. In any event, in the use of the straight one-piece plank structure the upper or outer end of the plank does not provide a rest or platform for the truck which latter would by gravity accidentally slide down the plank, if released, causing damage to the goods and possibly injury to attendants and others. It is difficult under any conditions to properly position the common type of gang plank, especially at its outer end, for expeditious handling of the freight. There are many other disadvantages in the use of the common type of gang plank, but it is thought that the disadvantages mentioned are sufficient to disclose some of the advantages and the principal objects of the present invention.

It is, therefore, one object of my invention to provide a freight gang plank embodying hinged sections which may be adjusted at any angle with relation to each other so that the upper section may be disposed on a horizontal plane for the purpose of allowing a loaded truck to come to rest and remain immovable until manual or mechanical power is applied to move it.

Another object resides in the provision of a gang plank embodying adjustable parts operable to expeditiously and economically effect loading and unloading of inland river boats, irrespective of the character or condition of the way landings, or whether the tide be high or low.

Another object resides in the provision of a gang plank which may be easily and readily substituted for the common type of straight one-piece gang plank structure and easily operated to provide a platform or resting place at the outer end of the same for the temporary support of the freight or truck carrying the same and from which it may be readily removed to take it to a storehouse or the like, or taken down the inclined portion of the gang plank to the boat.

A still further object resides in the provision of an adjustable gang plank of the nature stated embodying among other characteristics a cable connected to the gang plank for the purpose of moving a truck over the gang plank and which cable acts as a binder to bind the gang plank to the dock or top of the bank and also to press the lower end of the inclined section against the floor of the boat, causing the gang plank to be supported firmly at both ends during the use of the same.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings:

Figure 1 is a perspective view of a gang plank constructed in accordance with my invention.

Fig. 2 is an enlarged fragmentary longitudinal sectional view.

Fig. 3 is a fragmentary longitudinal sectional view through the gang plank at the abutting ends of the sections. Fig. 4 is a fragmentary view of the inclined section of the gang plank illustrating the end which abuts with the horizontal section thereof.

Figs. 5 to 8, inclusive, are views illustrating diagrammatically the various types of docks along certain rivers, showing the application of my improved freight handling gang plank.

Referring now more particularly to the accompanying drawings the reference character A indicates the inclined section of the gang plank provided at its lower end with an apron B and having depending side rails 10 connected by spaced cross pieces 11. These side rails and cross pieces strengthen the inclined section of the gang plank and each cross piece is provided with an opening 12 intermediate its ends in each of which is journaled in any suitable manner a grooved pulley 13.

The character C indicates the shorter or platform section of the gang plank provided with depending side rails 14 connected by cross pieces 15 having openings 12' therein adapted to aline with the aforesaid openings 12 of the section A and in which grooved pulleys 16 are journaled, there being an opening 17 formed through the section C at the outer end thereof and in which is journaled a pulley 18 which extends only slightly above the surface of the section C. The openings 12 and 12' in the gang plank sections A and C are formed alike and the pulleys 13 and 16 of the respective sections are mounted in the openings in the same way and as best illustrated in Fig. 4.

The sections A and C are hingedly connected together in any suitable manner, the hinges 19 illustrated for this hinge connection being shown solely for the purpose of illustration. Any suitable type of hinge connection may be employed for the purpose.

Owing to the before-mentioned difficulties the sections A and C which are hingedly connected together require adjustment at times with relation to each other. In other words, it is the purpose of the invention to have the upper section C disposed normally in a horizontal plane and as the degree of inclination necessary to be assumed at times by the inclined section A incident to the rise and fall of tides and to the distance between the deck of the boat and the landing, I provide suitable means to enable easy adjustment of the sections relative to each other and this adjusting means is of such character as to provide not only for the necessary adjustment but to provide for an efficient bracing of the adjusted sections. To this end I have illustrated one form of adjusting and bracing means at D the same being located on opposite sides of the gang plank at the abutting hinged ends of the sections A and C. In this particular embodiment of adjusting and bracing means, I employ two posts 20 and 21, each of which may be provided with a hand wheel 22, if desired, and each of which is screw threaded throughout a portion of its length. To that end of the inclined section A which abuts with the inner end of the section C, I secure in any suitable manner, suitable brackets 23 and 24, respectively, which are so constructed as to provide guides 25 and 26 to loosely and slidably receive the respective posts 20 and 21. The guides 23 and 24 slidably and loosely receive the respective posts 20 and 21 in such a way as to prevent binding of the posts therein irrespective of the positions assumed by the posts or other parts of the device. On the lower end of each post 20—21 a collar 27 is secured loosely between spaced collars 37 and 38 keyed to respective posts by means of suitable fastenings 39' and, by virtue of which, the posts are rotatable at their lower ends in said collars 37 and 38. The collars 27 are connected by the brace 27'. The collars are provided with ears 28 and 29 in which I pivotally secure the outer ends of bracing links 30 and 31, respectively, whose inner ends are pivotally connected in any suitable manner to the sections C and A, respectively, as clearly shown in Figs. 1 and 2. The lower ends of the posts are rotatable in the respective collars 27. A screw threaded nut 32 is rotatably mounted on the screw threaded portion of each post and provided with ears 33 and 34 in which are pivotally mounted links 35 and 36, respectively, in turn pivoted to the respective aforesaid bracing links 30 and 31.

By turning the posts 20 and 21 in the collars 27 and the respective guides 25 and 26, the bracing links 30 and 31 are drawn toward each other or spread apart according to the direction of rotation of the posts and as may be required. For instance, by turning the posts to the right the nuts 32 will be caused to travel toward the upper ends of the posts and, by virtue of the link connections 35 and 36 between the nuts 32 and the respective bracing links 30 and 31, the latter will be drawn toward each other, as shown by dotted lines in Fig. 2. By reverse rotation of the posts 20 and 21 the bracing links 30 and 31 will be spread apart as will be obvious. In any event, the posts 20 and 21 are always maintained at substantially a direct right angle to a straight line drawn between the pivotal connection of the bracing links 30 and 31 with the respective gang plank sections C and A.

In the use of my improved freight gang plank, and as should be understood from the foregoing, the platform section C is disposed on the way landing in a horizontal plane, while the lower end of the inclined section A rests on the deck of the boat. When unloading the boat, the freight is taken up the inclined section A to the horizontal section C from which latter it may be removed by deck hands or otherwise, in any suitable manner. When loading the boat, it is proposed that the freight be placed on the horizontal section C and later sent down the inclined section A on to the boat.

To facilitate loading and unloading, I provide my improved gang plank with suitable truck elevating means and this latter means consists in part of the aforesaid pulleys 13, 16 and 18 all of which are arranged in alinement and preferably midway between the sides of the gang plank, as should now be understood. Over these pulleys operates a wire rope or other suitable cable 39. The free end of this cable 39 is provided with suitable means for connecting it with the truck (not shown) as, for instance, a hook 40. The opposite end of the cable 39 is connected with a suitable winch (not shown) on the boat and which may be operated in any suitable manner to pay out or draw in the cable. The cable operates under the gang plank over the pulleys 13 and 16 and passes up through the opening 17 in the section C and over the pulley 18 disposed in said opening 17 in the section C, there being a pulley 41 on the deck beneath the apron B, or under the lower end of section A and another pulley 42 on the deck over which the cable passes between the lowermost pulley 13 and the winch or other means for operating the cable. At this point it may be stated that the apron B may be eliminated, if desired, and it is just as obvious that, if desired, a similar apron may be connected to the outer end of the platform section C. It is also obvious that the gang plank sections may be provided with side hand rails if desired but it is thought entirely unnecessary to illustrate the same.

By virtue of the cable 39 operating below and over the gang plank sections the same, when a loaded truck is being transported over the gang plank, performs the function of binding opposite ends of the gang plank against the way landing and the deck of the boat. In other words, the cable in operation pulls down on the plank thereby pressing it hard against the landing and the deck, firmly supporting both ends of the gang plank and causing it to retain the position in which it is placed. The gang plank is entirely loose from the boat and may be swung around to any position in the usual manner, or raised or lowered by a derrick crane in the manner now commonly employed for swinging the one-piece gang plank structures, or the gang plank may be positioned by manual, rather than by mechanical means. The manner of positioning the gang plank forms no part of my invention.

Most of the way landings along the Mississippi and other rivers are of made land and very frequently nothing but the natural land, and generally about the same height above the water, but whether they are of the natural or made kind, these banks are constantly breaking up and becoming irregular in form. When this is considered in connection with the fact that the distance between the deck and the way landing varies incident to the rise and fall of tides, it is apparent that at times the ordinary straight plank structure now employed has to assume such a great degree of inclination that it is practically, if not wholly, impossible at times for laborers to walk up or down the same. Under such conditions it would be practically impossible to transport the freight up or down the gang plank, especially up the same, because of the outer end of the gang plank either projecting entirely above the normal plane of the way landing, or not up to the working plane of the dock or landing.

As illustrating the application of my freight gang plank I refer to Figs. 5 to 8, inclusive, wherein in Fig. 5 the tide is low as indicated at 43, causing a high bank 44 at the way landing, necessitating a steep inclination of the gang plank. If the bank is so high that the outer end of the ordinary gang plank did not reach beyond the point $x$ in Fig. 5 it would be quite impossible to load and unload especially when employing a truck, whether the truck be propelled manually or mechanically. In the use of my improved gang plank the horizontal platform section C would form a horizontal rest at the point $x$ providing a suitable landing adjacent the top of the bank.

What is claimed is:

1. A gang plank comprising two sections hingedly connected together, guides secured to one of the sections, posts slidable in the guides and screw threaded a portion of their lengths, links having pivotal connection with the lower ends of the posts and also having pivotal connection with the sections, a nut mounted on the screw threaded portion of each post for movement longitudinally of the posts upon rotation of the latter, and link connections between each nut and the respective links.

2. A gang plank comprising two sections hingedly connected together, guides secured to the longer section at the point of hinge connection and projecting laterally from the sections, posts slidable in the guides and screw threaded a portion of their lengths, links having pivotal connection with the lower ends of the posts and also having pivotal connection with the sections on opposite sides of the hinge connection, a nut mounted on the screw threaded portion of each post for movement longitudinally of the post upon rotation of the latter, and links having pivotal connection with the nut and the aforesaid links.

In testimony whereof I affix my signature in presence of two witnesses.

LOUIS SIMPSON.

Witnesses:
 O. E. BEARNOR,
 LEO STOFFEL.

Copies of this patent may be obtained for five cents each, by addressing the "Commissioner of Patents, Washington, D. C."